Nov. 30, 1965   W. L. VEARIL   3,220,314
MECHANISM FOR ORBITAL MOVEMENT OF MILLING MACHINE SPINDLE
Filed April 10, 1964   6 Sheets-Sheet 4

United States Patent Office 3,220,314
Patented Nov. 30, 1965

3,220,314
MECHANISM FOR ORBITAL MOVEMENT OF MILLING MACHINE SPINDLE
Wayne L. Vearil, Milford, Ohio, assignor to The Cincinnati Milling Machine Co., Cincinnati, Ohio, a corporation of Ohio
Filed Apr. 10, 1964, Ser. No. 358,912
8 Claims. (Cl. 90—14)

This invention relates to milling machine spindles and more particularly to a mechanism for simultaneous axial reciprocation and lateral swinging movement of a rotating spindle in which a cam relieved form milling cutter is used.

A recent development in the milling art is the use of a spindle in a form milling operation which reciprocates axially in a timed relationship with a simultaneous transverse arcuate swinging motion of the spindle to account for a reduction in size of a cam relieved form milling cutter. Previously, cutters of the cam releived form type have had a short useful life since sharpening reduces their size and the physical size of the cutter determined the size of the milled form resulting from its use. With the new concept of orbiting the cutter by the combined motions described, the cutter, while reduced in actual physical size, can be made to appear as if it were still of full size and a full size contour can be produced with the cutter although it is actually reduced in size.

It is an object of this invention to provide an improved mechanism to produce simultaneous axial reciprocation and transverse swing motion of a rotatable spindle.

It is a further object of the invention to provide a mechanism of the type described which is conveniently and accurately adjustable to produce any combination of axial reciprocation and transverse swinging motion within the ranges of movements provided.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In its preferred form, this invention is comprised of two mechanical systems driven by the same power source which rotates the machine spindle. The spindle is rotatably supported in an eccentric position in a sleeve which is rotatable in a quill that in turn is supported in a spindle carrier member for axial movement. Each of the two mechanical drive systems is similar to the other and has a cam rotated simultaneously with the spindle at a fixed ratio of relative speeds. Each cam has a track extending therearound having two portions of different radii and two transitional portions joining the two different radii portions to make a continuous track. As the cams rotate, they each drive a follower member in a reciprocating manner and each follower member is connected to an intermediate member by means of an adjustable linkage that is selectively adjustable to pick off any length of reciprocal stroke from the follower member to which it is connected within a range from zero to a predetermined maximum length to drive the intermediate member reciprocally. Means are provided to convert reciprocation of one of these intermediate members into a reciprocal swinging motion of the sleeve in which the spindle is rotatable and to convert reciprocation of the other of the intermediate members into axial reciprocation of the quill. Through the use of the two different radii portions of the cam, each portion of which remains constant over a wide angular range of the cam, a dwell is achieved in each of the forward and back positions of the quill and the side to side angular positions of the sleeve. Movement forward and back and side to side occurs only during contact of the followers with the transitional portions of the cam tracks extending between the constant radii portions.

A clear understanding of the construction and operation of the mechanism can be obtained from the following detailed description in which reference is made to the attached drawings wherein.

Figure 1:
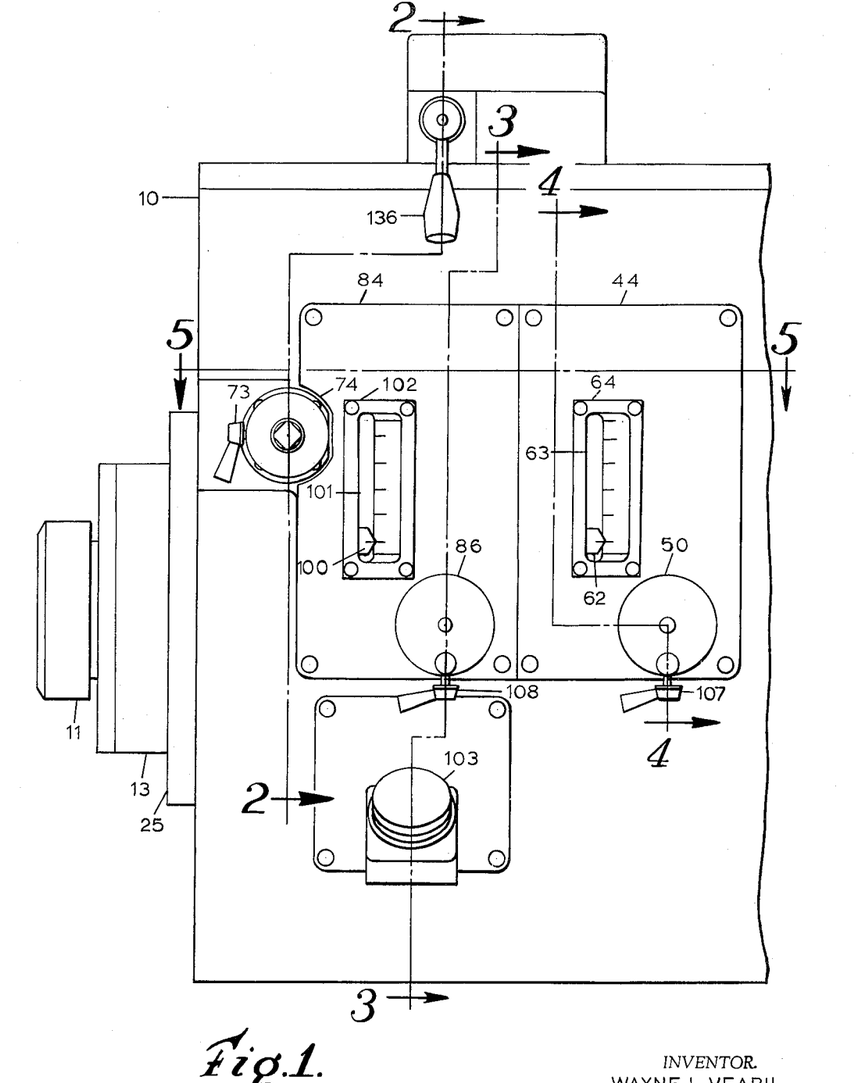
FIG. 1 is a partial side elevation of a milling machine spindle carrier unit.
Figure 3:
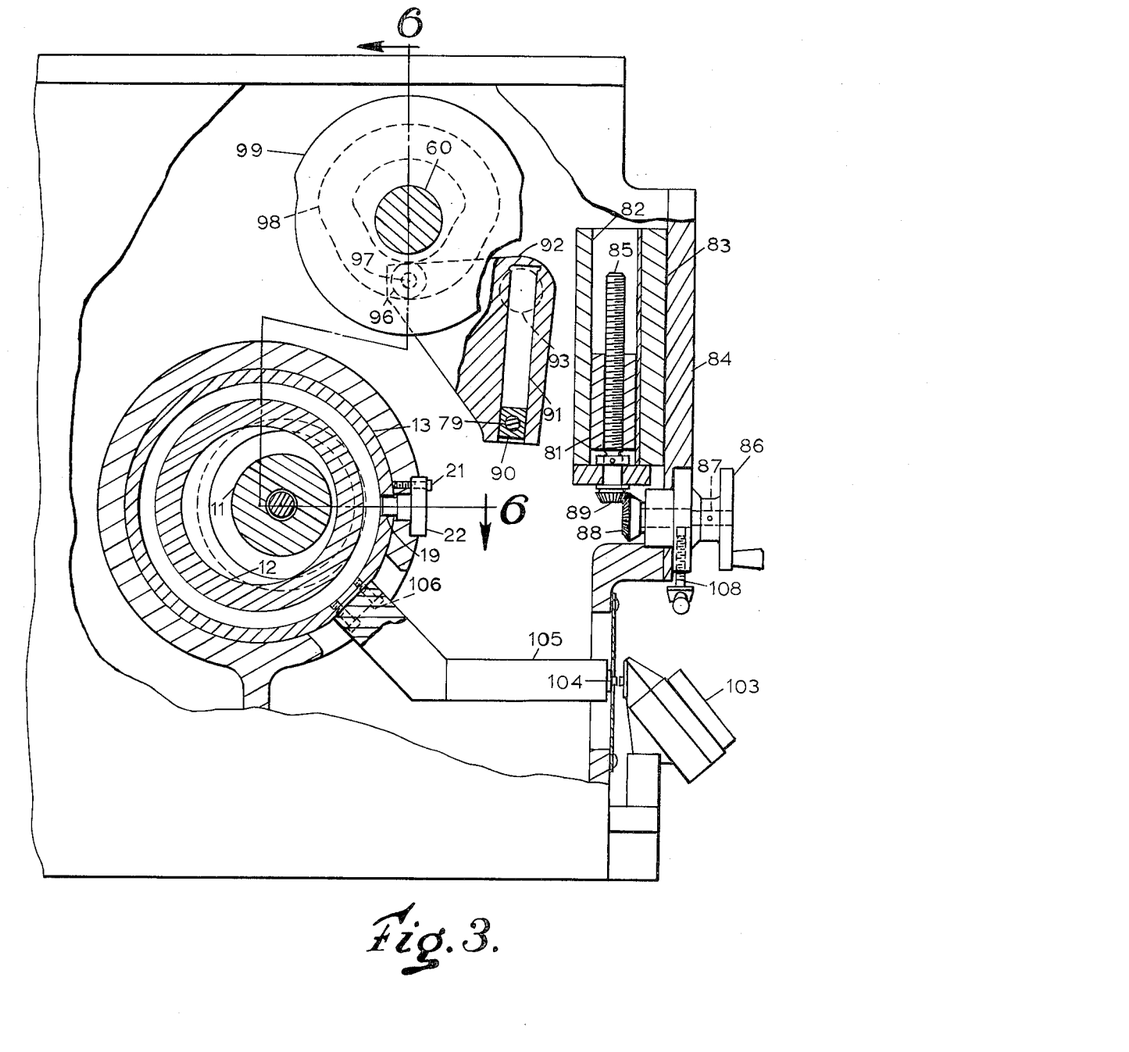
FIG. 3 is a sectional view of the unit of FIG. 1 on line 3—3 thereof.
Figure 6:
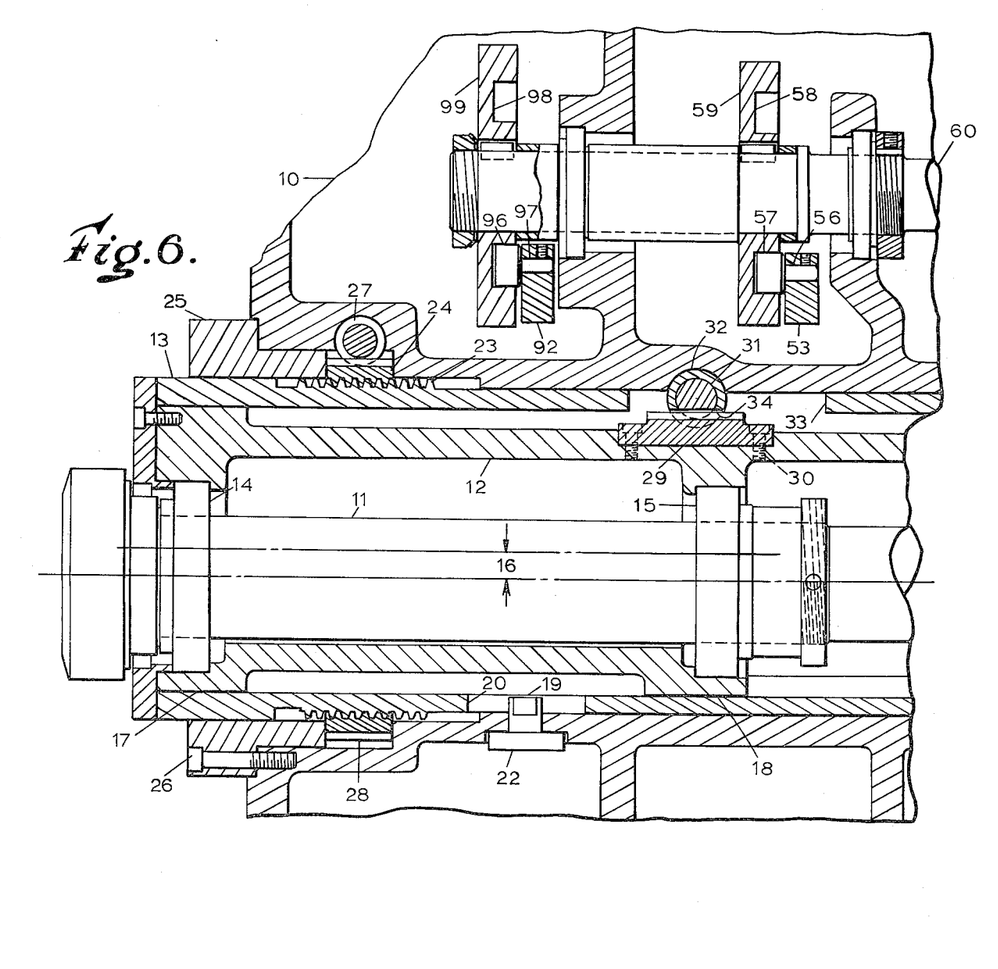
FIG. 6 is a sectional view of the spindle mechanism as viewed from line 6—6 of FIG. 3.

In FIG. 1 a portion of a milling machine spindle carrier housing 10 is shown wherein a spindle 11 is rotatably held in a sleeve 12, FIG. 6, that in turn is received through a quill 13. The sleeve 12 is rotatable in the quill 13 and the quill 13 is axially movable in the housing 10. The sectional view of FIG. 6 discloses the manner in which the spindle 11, sleeve 12 and quill 13 are mounted. The spindle 11 is rotatably received through bearings 14, 15 in the sleeve 12 and the central axis of the spindle 11 is off-set from the central axis of the sleeve 12 by a distance 16. The sleeve 12 is supported through the quill 13 for rotation therein and is held concentric therewith by the journal surfaces 17, 18 which are close running fit surfaces where lubrication is introduced by conventional means (not shown). The quill 13 is received in the housing 10 and is slidable in an axial direction being prevented from rotating by a tongue 19 that extends into a slot 20 along one side of the quill 13. The tongue 19 is fixed in the housing 10 by means of screws 21 extending through a flange 22 and threaded into the housing 10 (FIG. 3).

The quill 13 has a threaded portion 23 therearound which is engaged by a rotatable nut 24 that is axially fixed in the housing 10 by a bushing 25 fixed in turn around the quill 13 and secured to the forward end of the housing 10 by screws 26. Rotation of the nut 24 one way and the other therefore will produce axial movement of the quill 13. Rotation of the nut 24 is accomplished by axial movement of a worm 27 extending transverse to the quill and engaged with worm gear teeth 28 around the outer periphery of the nut 24. Rotation of the worm 27 will also effect axial movement of the quill 13 when the worm 27 is held axially fixed.

The sleeve 12 has a gear sector 29 fixed thereto by screws 30 and the sector 29 is engaged by a rack 31 which is received for sliding movement through a sleeve 32 fixed in the housing 10. An opening 33 is provided in the quill 13 and the sleeve 32 has an opening 34 therein to expose the rack 31 for engagement with the sector 29. The opening 33 is sufficiently large to accommodate the full range of axial movement of the quill without interference. Reciprocating axial movement of the rack 31 will produce reciprocating rotary motion of the sleeve 12 in the quill 13 and since the spindle 11 is eccentric in the sleeve 12 it will swing in a reciprocating manner in a path that is an arc of a circle around the central axis of the sleeve 12 and having a radius equal to the distance 16.

Figure 4:
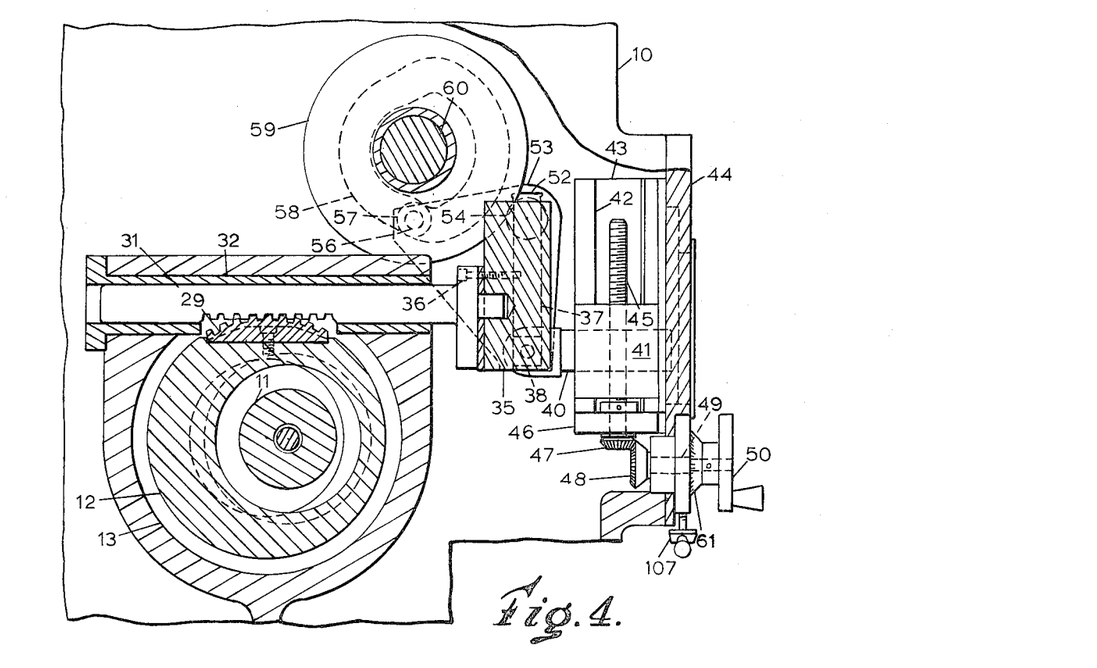
FIG. 4 is a sectional view of the unit of FIG. 1 on line 4—4 thereof.
Figure 5:
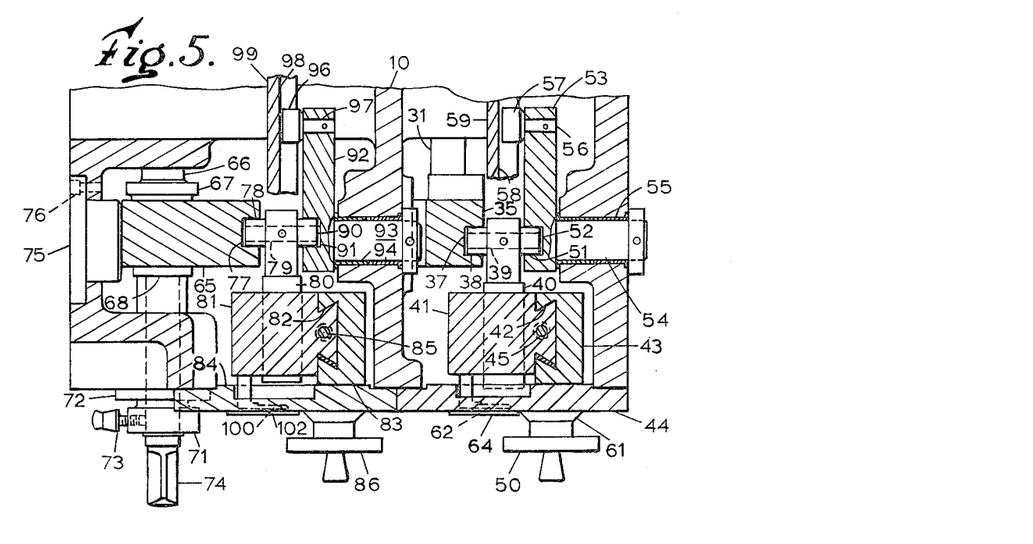
FIG. 5 is also a sectional view of the unit of FIG. 1 on line 5—5 thereof.

Both the worm 27 and the rack 31 are axially reciprocated by similar mechanisms. The mechanism which reciprocates the rack 31 is shown in FIGS. 4 and 5. The rack 31 is attached to a block 35 by screws 36 and an elongated track 37 is formed along one side of the block 35 perpendicular to the longitudinal axis of the rack 31. A shoe 38 is slidably received in the track 37 and is pivotally attached on a pin 39 through a plunger 40. The plunger 40 is parallel to the rack 31 and is received in a dovetailed member 41 for reciprocation therethrough. The dovetailed member 41 is slidably received in ways 42 along a member 43 fixed on a cover plate 44 in the housing 10. The dovetailed member 41 is held in place along the ways 42 by a screw 45 threaded therethrough. The screw 45 is rotatable in a yoke 46 attached to the fixed member 43 but the screw 45 is not axially movable therethrough. A beveled gear 47 is fixed on an end of the screw 45 and is engaged by another beveled gear 48 that is fixed on an end of a shaft 49, the other end of which has an adjusting handwheel 50 fixed thereon. Therefore, as the handwheel 50 is rotated, the screw 45 is rotated and the dovetailed member 41 is moved along the ways 42. The plunger 40 is adjusted laterally relative to the rack 31 and the shoe 38 slides along the track 37 to keep the plunger 40 connected to the block 35.

The pin 39 extends completely through the plunger 40 and a second shoe 51 is pivotally attached on its other end opposite to the shoe 38. The second shoe 51 is slidably embraced in a track 52 that extends along one side of a generally triangular member 53. The member 53 has a pin 54 extending outward therefrom at one corner and this pin 54 is journalled for rotation in bushings 55 in the housing 10. The member 53 also has a pin 56 fixed on another corner thereof spaced from the pin 54. The other pin 56 carries a cam follower roller 57 that extends into a cam track 58 in a cam 59 that is rotatable with a shaft 60. The track 58 extends completely around the side of the cam 59 and includes two portions of constant radius of curvature and short transitional portions to join the constant radius portions and complete the track 58. Since the two constant radius portions of the track 58 have different radii as shown, the member 53 is caused to swing on the pin 54 as the cam 59 is rotated with the shaft 60. The track 52 extends radially outward from the corner where the pin 54 is located and therefore the shoe 51 is reciprocally swung in an arc of constant angular dimension to reciprocate the plunger 40 in the dovetailed member 41 and this produces reciprocation of the block 35 and rack 31 through the engagement of the shoe 38 in the track 39. The radius of the arc through which the shoe 51 is swung is adjustable by a shift of the dovetail member 41 and this adjusts the reciprocal stroke of the plunger 40 and rack 31. The handwheel 50 has a collar 61 integral therewith and the collar 61 is calibrated to indicate the change in stroke length per revolution of the handwheel 50. In addition the dovetailed member 41 carries a pointer 62, FIG. 1, that is viewable through an opening 63 in a calibrated plate 64 in the cover plate 44 to indicate the chordal distance between end points of the arc through which the spindle 11 is adjusted to swing by a selected positioning of the dovetailed member 41.

Figure 2:
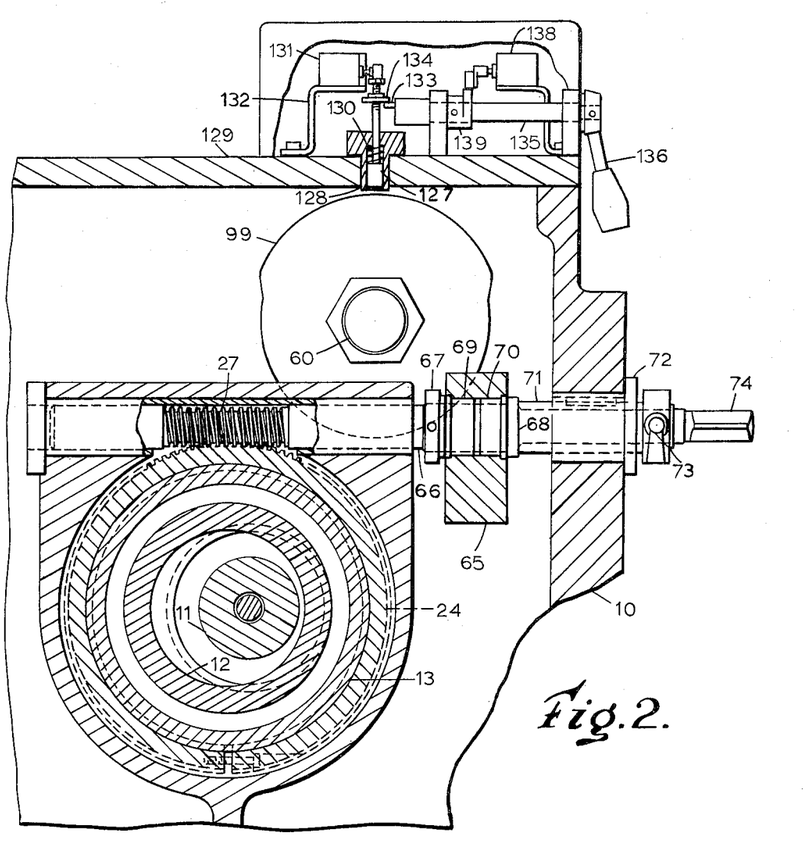
FIG. 2 is a sectional view of the unit of FIG. 1 on line 2—2 thereof.

The worm 27 is reciprocated by a mechanism similar to that described for reciprocation of the rack 31. The mechanism is shown in FIGS. 2, 3 and 5. The worm 27 is rotatable as well as being axially movable. A block 65 is attached to a shaft portion 66 of the worm 27 by a nut 67 and a shoulder 68 and a pair of annular bearings 69, 70 are received in the block 65 around the shaft 66 to render them relatively rotatable. A bushing 71 is received over the shaft 66 and is slidable through a bushing 72 fixed in the housing 10, the two bushings being keyed together to allow relative axial movement only between them. A locking screw 73 extends through the bushing 71 against the shaft 66 to hold these two members normally relatively fixed so that the worm 27 is rendered only axially movable by the keyed connection between the bushings 71, 72. The screw 73 can be withdrawn from the shaft 66 and a crank (not shown) can be applied to the squared shaft end 74 to rotate the worm 27. This adjusts the axial position of the quill 13 but the points of reversal of quill are not relatively adjusted to change the length of axial stroke.

The block 65 is prevented from swinging out of proper orientation on the shaft 66 by a back-up member 75 fixed in the housing 10 by screws 76 and against which the block 65 is adapted to slidably reciprocate. The block 65 has a track 77 along one side thereof to function in the same manner as the track 37 in the block 35. The track 77 is engaged by a shoe 78 on a pin 79 through a plunger 80. The plunger 80 is reciprocable through a dovetailed member 81 that is slidably positionable along a dovetail way 82 in a member 83. The member 83 is fixed inside the housing 10 on a cover plate 84. A screw 85 is engaged through the dovetailed member 81 and is rotatable by a handwheel 86 on a shaft 87 by means of a geared connection including beveled gears 88 and 89. A second shoe 90 is fixed on the other end of the pin 79 and this second shoe 90 is slidable along a track 91 in a generally triangular shaped member 92. The member 92 is pivotal about one corner where a pin 93 fixed therein is journalled in bushings 94 in the housing 10. A follower roller 96 is fixed to a pin 97 at another corner of the member 92 and the roller 96 is embraced in a track 98 around the side of a cam 99 which is also attached to the shaft 60 for rotation therewith. The dovetailed member 81 also carries a pointer 100 which is viewable through on opening 101 in a calibrated plate 102 fixed to the cover plate 84 and by which the operator can read the adjustment for axial movement of the quill 13. In addition, an optical viewing apparatus 103 is provided to give the operator a magnified view of a precision scale 104 that is attached to an arm 105 which extends laterally from the side of the quill 13. The arm 105 is firmly attached to the quill 13 by screws 106 and the scale 104 thereon provides an accurate indication of axial movement of the quill 13.

From the foregoing descriptions it can be seen that both the worm 27 and the rack 31 are reciprocated by similar mechanisms and these are similarly adjustable to provide a selectivity for the axial stroke of the quill 13 and the lateral swing of the sleeve 12 to provide the simultaneous lateral and axial movement of the spindle 11. Both of the mechanisms described can be locked in an adjusted stroke setting by the tightening down of a pair of screws 107, 108, respectively, adapted to engage the handwheel shafts 49, 87.

Figure 8:
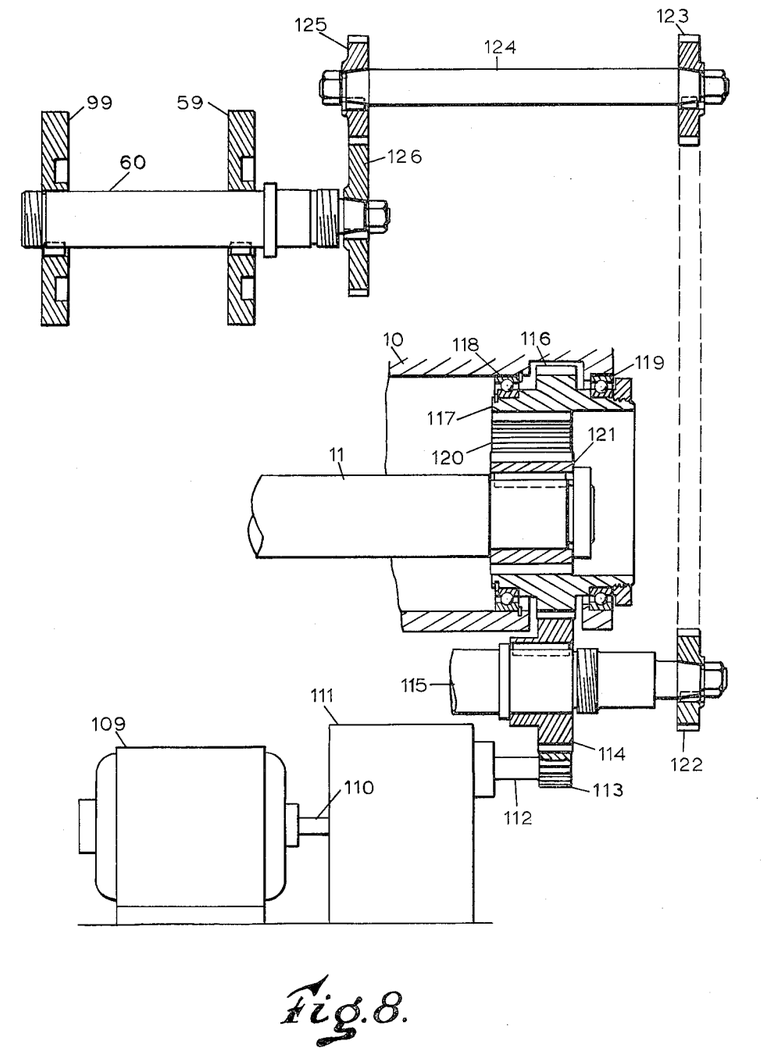
FIG. 8 is a schematic showing of the mechanical drive input to the spindle mechanism.

The two cams 59, 99 are driven in unison since they are both fixed to a common shaft 60. As shown in FIG. 8, the shaft 60 is driven from the same power source, motor 109, that is connected to rotate the spindle 11. The motor 109 drives a shaft 110 providing the input drive to a set of speed change gears represented by the block 111. The change gears of the block 111 can be a transmission of any well known type either manually or power actuated to provide a selected one of a plurality of different speeds of rotation of an output shaft 112 and since transmissions of this type are well known in the art, further description herein is omitted. The output shaft 112 has a gear 113 fixed thereon which is engaged with and drives a gear 114 on another shaft 115. The gear 114 is engaged with a gear 116 around the outer periphery of a member 117 that is rotatable in bearings 118, 119 in the housing 10 and is concentric with the quill 13 and sleeve 12. An internal gear 120 is formed in the member 117 and this internal gear 120 is engaged by a pinion 121 fixed on the rear end of the spindle 11. Thus, the drive from the motor 109 is transmitted to the spindle 11. The radius of the internal gear 120 is such that it coincides with the radius of the circle traced by the outside diameter of the pinion 121 as the spindle is laterally swung with the sleeve 12 in the quill 13. The shaft 115 also has a gear 122 fixed on it which is engaged to drive a gear 123 on a shaft 124. A gear 125 is fixed on the other end of the shaft 124 and the gear 125 engages a gear 126 on the end of the shaft 60 to complete the transmission from the motor 109 to the cams 59, 99. The gear ratios are chosen in the transmissions described such that the spindle 11 makes at least two revolutions for each revolution of the cams 59, 99 to provide a complete clean-up of a milled slot on each side. The ratio of cam rotation to spindle rotation remains constant over the range of speeds provided by the change box 111.

A signal mechanism is shown in FIG. 2 to provide an indication during machine set-up of the axial position of the quill 13. A plunger 127 is slidably received through a bushing 128 fixed in a cover plate 129 over the top of the housing 10. The plunger 127 is urged inward by a spring 130 to engage the periphery of the cam 99 that is shaped in accordance with the cam track 98. The upper end of the plunger 127 is adapted to engage and operate a limit switch 131 fixed on a bracket 132. A signal is available from the limit switch 131 to indicate whether the quill 13 is forward or back. During machine operation, the plunger 127 is lifted away from the cam 99 since signals from the switch 131 are used only during machine set-up. The plunger 127 is lifted by an eccentric pin 133 which lifts against a disc 134 fixed on the plunger. The pin 133 is fixed in the end of a shaft 135 which is rotatable by a handle 136, the pin 133 being eccentric relative to the axis on which the shaft 135 is rotated. A cam 139 is fixed on the shaft 135 to operate another limit switch 138 when the shaft 135 is rotated to the position shown in which the plunger 127 is lifted clear of the cam 99.

Figure 7:
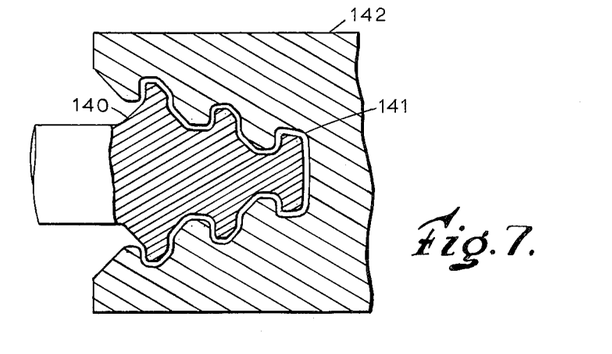
FIG. 7 is a sectional view of a cam relieved form cutter in a workpiece.

The effect upon the cut produced by a cam relieved form milling cutter is shown in FIG. 7. The cutter 140 has been resharpened to the point that an under size slot would be produced by a straight feeding operation through the workpiece. The desired size of slot 141 is shown in the workpiece 142 however. By adjustment of the transverse swing of the cutter one way and the other, the proper slot width can be obtained and by adjustment of the simultaneous axial motion of the quill, the proper depth of slot contour can be achieved. The cutter 140, although under size, appears to the workpiece 142 to be full size and a full size slot is produced. Thus the cutter 140 has a much longer useful life which is important in the use of cam relieved form milling cutters since these cutters have a high initial cost.

What is claimed is:

1. In a milling machine spindle carrier having therein a rotatable spindle eccentrically supported in an axially movable quill for movement along an arcuate path around the central axis of the quill, a mechanism for simultaneously reciprocating the quill axially and swinging the spindle reversibly on the arcuate path comprising in combination:
   (a) a pair of cams rotatably supported in the spindle carrier,
   (b) a pair of drive members supported in the spindle carrier for axial movement,
   (c) means for reciprocating each of said drive members in response to rotation of a respective one of said cams and including an adjustable linkage for varying the length of reciprocal stroke of the respective drive members,
   (d) means for axially shifting the quill one way and the other in response to reciprocation of one of said drive members,
   (e) means for swinging the spindle one way and the other in response to reciprocation of the other of said drive members along the arcuate path, and
   (f) means for rotating said cams at a rate reduced from the rate of rotation of the spindle.

2. In a milling machine spindle carrier having therein a rotatable spindle eccentrically supported in an axially movable quill for movement along an arcuate path around the central axis of the quill, a mechanism for simultaneously reciprocating the quill axially and swinging the spindle reversibly on the arcuate path comprising in combination:
   (a) a pair of cams rotatably supported in the spindle carrier, each cam having a continuous track therearound with portions of different radial distances from the axis of rotation of said cams,
   (b) a pair of pendent members each supported in the spindle carrier adjacent to a respective one of said cams for swinging movement around one corner thereof,
   (c) a cam follower attached to each of said pendent members and spaced from said one corner thereof, said followers each engaged with the track of the respective one of said cams,
   (d) a pair of axially movable drive members in the spindle carrier,
   (e) means for connecting each of said drive members to a respective one of said pendent members for axial reciprocation in response to swinging motion of said pendent members,
   (f) means for axially shifting the quill one way and the other in response to reciprocation of one of said drive members,
   (g) means for swinging the spindle one way and the other along the arcuate path thereof in response to reciprocation of the other of said drive members, and
   (h) means for rotating said cams to swing each of said pendent members around said one corner thereof.

3. In a milling machine spindle carrier having therein a rotatable spindle eccentrically supported in an axially movable quill for movement along an arcuate path around the central axis of the quill, a mechanism for simultaneously reciprocating the quill axially and swinging the spindle reversibly on the arcuate path comprising in combination:
   (a) a pair of cams rotatably supported in the spindle carrier, each cam having a continuous track therearound with portions of different radial distances from the axis of rotation of said cams,
   (b) a pair of pendent members each supported in the spindle carrier adjacent to a respective one of said cams for swinging movement around one corner thereof,
   (c) a cam follower attached to each of said pendent members and spaced from said one corner thereof, said followers each engaged with the track of the respective one of said cams,
   (d) a track on each of said pendent members extending away from said one corner thereof,
   (e) a pair of axially movable drive members in the spindle carrier,
   (f) means adjustably connected along each of said pendent member tracks for translating swinging movement of said pendent members into axial reciprocation of said drive members,
   (g) means for axially shifting the quill one way and the other in response to reciprocation of one of said drive members,
   (h) means for swinging the spindle one way and the other along the arcuate path thereof in response to reciprocation of the other of said drive members, and
   (i) means for rotating said cams to swing each of said pendent members around said one corner thereof.

4. In a milling machine spindle carrier having therein a rotatable spindle eccentrically supported in an axially movable quill for movement along an arcuate path around the central axis of the quill, a mechanism for simultaneously reciprocating the quill axially and swinging the spindle reversibly on the arcuate path comprising in combination:
- (a) a pair of cams rotatably supported in the spindle carrier, each cam having a continuous track therearound with portions of different radial distances from the axis of rotation of said cams,
- (b) a pair of pendent members each supported in the spindle carrier adjacent to a respective one of said cams for swinging movement around one corner thereof,
- (c) a cam follower attached to each of said pendent members and spaced from said one corner thereof, said followers each engaged with the track of the respective one of said cams,
- (d) a track on each of said pendent members extending away from said one corner thereof,
- (e) a pair of axially movable drive members in the spindle carrier,
- (f) a pair of plungers,
- (g) means for pivotally attaching each of said plungers to a respective one of said pendent member tracks,
- (h) means for adjustably positioning each of said plungers along the respective pendent track and for confining said plungers to axial reciprocal motion in response to swinging movement of said pendent members,
- (i) means for reciprocating one and the other of said drive members in unison with one and the other of said plungers,
- (j) means for axially shifting the quill one way and the other in response to reciprocation of one of said drive members,
- (k) means for swinging the spindle one way and the other along the arcuate path thereof in response to reciprocation of the other of said drive members, and
- (1) means for rotating said cams to swing each of said pendent members around said one corner thereof.

5. In a milling machine spindle carrier having therein a rotatable spindle eccentrically supported in an axially movable quill for movement along an arcuate path around the central axis of the quill, a mechanism for simultaneously reciprocating the quill axially and swinging the spindle reversibly on the arcuate path comprising in combination:
- (a) a pair of cams rotatably supported in the spindle carrier, each cam having a continuous track therearound including two circular arc portions of different radii concentric with and on opposite sides of the axis of rotation of the cam and non-concentric transitional portions joining the ends of the two circular arc portions,
- (b) a pair of pendent members each supported in the spindle carrier adjacent to a respective one of said cams for swinging movement around one corner thereof,
- (c) a cam follower attached to each of said pendent members and spaced from said one corner thereof, said followers each engaged with the track of the respective one of said cams,
- (d) a pair of axially movable drive members in the spindle carrier,
- (e) means for connecting each of said drive members to a respective one of said pendent members for axial reciprocation in response to swinging motion thereof,
- (f) means for axially shifting the quill one way and the other in response to reciprocation of one of said drive members,
- (g) means for swinging the spindle one way and the other along the arcuate path thereof in response to reciprocation of the other of said drive members, and
- (h) means for rotating said cams to swing each of said pendent members around said one corner thereof, said swing occuring only while said followers are engaged with said transitional cam track portions.

6. In a milling machine spindle carrier having therein a rotatable spindle eccentrically carried in a sleeve, the sleeve rotatably supported in an axially movable quill, a mechanism for simultaneously axially reciprocating the quill and reversely rotating the sleeve through an angular stroke comprising in combination:
- (a) a pair of cams rotatably supported in the spindle carrier,
- (b) a pair of drive members supported in the spindle carrier for axial movement,
- (c) means for reciprocating each of said drive members in response to rotation of a respective one of said cams and including an adjustable linkage for varying the length of reciprocal stroke of the respective drive members,
- (d) means for axially shifting the quill one way and the other in response to reciprocation of one of said drive members,
- (e) means for reversely rotating the sleeve in the quill through a limited angular stroke in response to reciprocation of the other of said drive members, and
- (f) means for rotating the spindle and said cams at a predetermined ratio of speeds.

7. In a milling machine spindle carrier having therein a rotatable spindle eccentrically carried in a sleeve, the sleeve rotatably supported in an axially movable quill, a mechanism for simultaneously axially reciprocating the quill and reversely rotating the sleeve through an angular stroke comprising in combination:
- (a) a pair of cams rotatably supported in the spindle carrier,
- (b) a first toothed drive member axially movable in the spindle carrier transverse to the sleeve,
- (c) a first toothed gear member fixed to the sleeve and engaged with said first toothed drive member,
- (d) a second toothed drive member axially movable in the spindle carrier transverse to the quill,
- (e) a second toothed gear around the quill and engaged with said second toothed drive member, said second toothed gear rotatable at a fixed location in the spindle carrier and having a threaded internal diameter,
- (f) a threaded area on said quill engaged with the internal diameter of said second toothed gear,
- (g) means for reciprocating each of said first and second toothed drive members in response to rotation of a respective one of said cams and including an adjustable linkage for independently varying the reciprocal stroke of each of said toothed drive members, and
- (h) means for rotating said cams and the spindle at a predetermined speed ratio.

8. In a milling machine spindle carrier having therein a rotatable spindle eccentrically carried in a sleeve, the sleeve rotatably supported in an axially movable quill, a mechanism for simultaneously axially reciprocating the quill and reversely rotating the sleeve through an angular stroke comprising in combination:
- (a) a pair of cams rotatably supported in the spindle carrier, each cam having a continuous track therearound with portions of different radial distances from the axis of rotation of said cams,
- (b) a pair of pendent members each supported in the spindle carrier adjacent to a respective one of said cams for swinging movement around one corner thereof,
- (c) a cam follower attached to each of said pendent members and spaced from said one corner thereof, said followers each engaged with the track of the respective one of said cams,
- (d) a track on each one of said pendent members extending away from said one corner thereof,
- (e) a pair of plungers,
- (f) means for pivotally attaching each of said plungers to a respective one of said pendent member tracks, (g) means for adjustably positioning each of said plungers along the respective pendent member track and for confining said plungers to axial reciprocation in response to swinging movement of said pendent members,
(h) a first toothed drive member axially movable in the spindle carrier transverse to the sleeve,
(i) a first toothed gear member fixed to the sleeve and engaged with said first toothed drive member,
(j) a second toothed drive member axially movable in the spindle carrier transverse to the quill,
(k) a second toothed gear member around the quill and engaged with said second toothed drive member, said second toothed gear member rotatable at a fixed location in the spindle carrier and having a threaded internal diameter,
(l) a threaded area on said second quill engaged with the internal diameter of said second toothed gear member,
(m) means for connecting each of said first and second toothed drive members to a respective one of said plungers for reciprocation therewith, and
(n) means for rotating said cams to swing each of said pendent members around said one corner thereof.

No references cited.

WILLIAM W. DYER, JR., *Primary Examiner.*